Patented Nov. 20, 1928.

1,692,308

UNITED STATES PATENT OFFICE.

HAMILTON MERRILL, OF SOUTH ORANGE, NEW JERSEY, ASSIGNOR TO TOWER MANUFACTURING CO., INC., A CORPORATION OF NEW YORK.

PROCESS FOR THE PURIFICATION OF NITRANILINE.

No Drawing.     Application filed July 1, 1925.  Serial No. 40,978.

This invention relates to a process of purifying or treating nitraniline, specifically para-nitraniline, by removing certain by-products resulting from the process of manufacture, in a soluble form.

In the manufacture of para-nitraniline by the reaction of para-nitro-chlor-benzene with ammonia under pressure, certain by-products comprising nitro bodies are formed which cause a flocculent or cloudy precipitate to form during diazotization.

It is an object of this invention to so treat the nitraniline by suitable chemical means as to avoid a precipitation of this character and convert the impurity into soluble form so that it may be removed by filtration or other suitable means.

By way of detailed description of the invention the following preferred embodiments will be given but it is to be understood that they are illustrative merely, and not limiting.

One hundred and fifty parts of crude para-nitraniline are suspended in 1500 parts of water and 150 parts of sodium hydroxide dissolved in 1500 parts of water are added to the suspension. The temperature of the mixture is then gradually raised to about 100° C. with constant stirring or agitation. The charge is then cooled to about 40° to 50° C., filtered, and washed with water. The impurities are removed by the filtration while the para-nitraniline remaining is quite pure and gives a satisfactory solution when diazotized, free of the said objectionable impurities causing the precipitate.

In another form of the invention 150 parts of crude para-nitraniline are suspended in 2500 parts of water, and 200 to 300 parts of aqua ammonia of 24° to 26° Bé. are added. In a closed kettle the temperature of the charge is raised to about 95° to 100° C. and then cooled to about 40° to 45° C., after which the charge is filtered and washed. The resulting para-nitraniline is obtained in a satisfactory state of purity while the impurities originally present pass through into the filtrate. It is to be understood that this method of purification can be applied at any suitable point in the process or it may be applied to any form of crude nitraniline, howsoever produced.

The alkali renders the impurities soluble so that they can be removed by filtration, whereas the undissolved nitraniline remains behind in the filter.

While the foregoing embodiments of the invention have been described with some detail it is to be understood that my invention is not to be limited thereto except as defined in the following claims.

I claim:

1. The process which consists in treating para-nitraniline formed from para-nitro-chlor-benzol, in an aqueous solution of a solid alkali, then filtering off the solution from the nitraniline while the solution contains said alkali.

2. The process which consists in treating para-nitraniline formed from para-nitro-chlor-benzol, in an aqueous solution of a non-gaseous alkali, raising the temperature to near the boiling point, and then filtering off the solution from the nitraniline while the solution contains said alkali.

3. The process which consists in treating para-nitraniline formed from para-nitro-chlor-benzol, in an aqueous medium with caustic soda, and then filtering off the solution from the nitraniline while the solution contains said alkali.

4. The process of treating para-nitraniline produced from para-nitro-chlor-benzene with ammonia under pressure, which consists in treating the nitraniline in a hot aqueous solution of a non-volatile alkali, and then filtering off the solution while the solution contains said alkali.

In testimony that I claim the foregoing, I have hereunto set my hand this 29 day of June, 1925.

HAMILTON MERRILL.